(12) United States Patent
Caretta et al.

(10) Patent No.: US 8,789,514 B2
(45) Date of Patent: Jul. 29, 2014

(54) FUEL ADAPTATION FOR IC ENGINE

(75) Inventors: Gianluca Caretta, Regensburg (DE); Pascal Emery, Palaiseau (FR); Marcos Navarro, Paris (FR)

(73) Assignees: Continental Automotive GmbH, Hannover (DE); Renault SAS, Boulogne-Billancourt (FR)

( * ) Notice: Subject to any disclaimer, the term of this patent is extended or adjusted under 35 U.S.C. 154(b) by 436 days.

(21) Appl. No.: 13/000,016

(22) PCT Filed: May 25, 2009

(86) PCT No.: PCT/EP2009/003688
§ 371 (c)(1),
(2), (4) Date: Feb. 24, 2011

(87) PCT Pub. No.: WO2009/152924
PCT Pub. Date: Dec. 23, 2009

(65) Prior Publication Data
US 2011/0132332 A1 Jun. 9, 2011

(30) Foreign Application Priority Data
Jun. 19, 2008 (EP) .................................. 08011166

(51) Int. Cl.
*F02M 51/00* (2006.01)
(52) U.S. Cl.
USPC .......................................... 123/486; 123/299
(58) Field of Classification Search
USPC ................. 123/434, 445, 305, 541, 697, 703, 123/406.3, 406.47, 294, 299; 701/103, 104
See application file for complete search history.

(56) References Cited

U.S. PATENT DOCUMENTS

| 6,178,949 B1 * | 1/2001 | Kirwan et al. ................. 123/435 |
| 7,013,865 B2 | 3/2006 | Nagai et al. |
| 7,421,884 B2 | 9/2008 | Aoyama |

(Continued)

FOREIGN PATENT DOCUMENTS

| EP | 1593824 A2 | 11/2005 |
| EP | 1890024 A1 | 2/2008 |

(Continued)

OTHER PUBLICATIONS

International Search Report and Written Opinion for PCT/EP2009/003688, Sep. 16, 2009, 14 pages.

(Continued)

*Primary Examiner* — John Kwon
*Assistant Examiner* — Johnny H Hoang
(74) *Attorney, Agent, or Firm* — Skaar Ulbrich Macari, P.A.

(57) ABSTRACT

A method for controlling an automotive internal combustion engine having direct fuel injection is described, with the method comprising a fuel adaption part in which a fuel quality parameter (F) is determined using a first fuel quality parameter determination procedure when the engine exhibits predetermined operation conditions and a control part which uses the value of the fuel quality parameter (F) or of a fuel combustion characteristics parameter derived from the fuel quality parameter (F) as a target value ($\alpha T$) in a closed-loop control of the start of injection (SOI) at the engine, with the closed-loop control using a second fuel quality parameter determination procedure being different from the first fuel quality parameter determination procedure to determine an actual value ($\alpha A$) of the fuel quality parameter (F) or of the fuel combustion characteristics parameter derived from the fuel quality parameter (F).

10 Claims, 3 Drawing Sheets

(56) References Cited

U.S. PATENT DOCUMENTS

| | | |
|---|---|---|
| 7,438,049 B2 | 10/2008 | Caretta et al. |
| 7,735,478 B1* | 6/2010 | Dagci et al. ............... 123/676 |
| 2004/0103890 A1* | 6/2004 | Yasui et al. ............... 123/673 |
| 2005/0247285 A1 | 11/2005 | Nagai et al. |
| 2006/0011180 A1* | 1/2006 | Sasaki et al. ............... 123/698 |
| 2006/0169243 A1 | 8/2006 | Neunteufl et al. |
| 2007/0044759 A1 | 3/2007 | Yamaguchi et al. |
| 2007/0074505 A1* | 4/2007 | Ogawa et al. ............... 60/285 |
| 2007/0079647 A1* | 4/2007 | Aoyama ............... 73/35.02 |
| 2007/0119418 A1 | 5/2007 | Kojima et al. |
| 2007/0163542 A1* | 7/2007 | Kettl et al. ............... 123/435 |
| 2007/0175437 A1* | 8/2007 | Yamaguchi et al. ......... 123/294 |
| 2007/0225892 A1* | 9/2007 | Yasui et al. ............... 701/104 |
| 2007/0251493 A1* | 11/2007 | Evans ............... 123/357 |
| 2008/0097682 A1* | 4/2008 | Peron et al. ............... 701/103 |
| 2008/0140297 A1 | 6/2008 | Neunteufl et al. |
| 2009/0055081 A1* | 2/2009 | Yasui et al. ............... 701/103 |
| 2009/0055086 A1* | 2/2009 | Souidi et al. ............... 701/108 |
| 2009/0064967 A1* | 3/2009 | Shikawa et al. ............... 123/345 |
| 2009/0107441 A1* | 4/2009 | Husak et al. ............... 123/179.16 |
| 2009/0159046 A1* | 6/2009 | Moriya ............... 123/435 |
| 2009/0223485 A1* | 9/2009 | Hamedovic et al. ............... 123/435 |
| 2009/0234559 A1 | 9/2009 | Jung et al. |
| 2009/0299605 A1* | 12/2009 | Kweon et al. ............... 701/103 |
| 2009/0306875 A1* | 12/2009 | Jiang et al. ............... 701/102 |
| 2010/0305827 A1* | 12/2010 | Fournel et al. ............... 701/102 |
| 2011/0040473 A1* | 2/2011 | Haft et al. ............... 701/103 |

FOREIGN PATENT DOCUMENTS

| | | |
|---|---|---|
| FR | 2888880 | 1/2007 |
| JP | 2008133753 A | 6/2008 |
| WO | WO2005/005813 A2 | 1/2005 |
| WO | WO2005/119034 A1 | 12/2005 |
| WO | WO2007/010154 A2 | 1/2007 |
| WO | WO2008/034754 A1 | 3/2008 |
| WO | WO2009152924 A1 | 12/2009 |

OTHER PUBLICATIONS

International Preliminary Report on Patentability for PCT/EP2009/003688, mailed Jan. 6, 2011, 7 pages.

* cited by examiner

FUEL ADAPTATION FOR IC ENGINE

PRIORITY

This patent application claims the priority benefit of International Application PCT/EP2009/003688, filed on May 25, 2009, and European patent application 08011166.9-2311, filed Jun. 19, 2008, both of which are hereby incorporated by reference herein.

FIELD

The invention relates to a method and an apparatus for controlling an automotive internal combustion engine having direct fuel injection.

BACKGROUND

The performance of an internal combustion engine obviously depends on the quality of the fuel the engine burns. This is particularly true for direct injecting internal combustion engines, e.g. for direct injecting diesel engines. In such engines, the fuel is ignited by injecting the fuel directly into the combustion chamber after the gas contained therein has been compressed, i.e. the fuel-mixture generations occurs within the combustion chamber.

One well-known fuel quality parameter is the cetane number in the case of diesel fuel. The cetane number measures the combustion quality of the fuel during compression ignition. The cetane number is related to a fuel's ignition delay, i.e. to the time period between the start of injection (SOI) of fuel into the combustion chamber and the start of combustion (SOC) of the fuel, i.e. of ignition. Diesel engines running a fuel with higher cetane fuels will show shorter ignition delay periods than a lower cetane fuels. Fuels with higher cetane number, thus, have short ignition delay time periods and provide more time for the fuel combustion process to be completed. Hence, the question of cetane number becames vital with high speeds of diesel engines.

In order to avoid an undesired performance of an engine, it is, therefore, known in the state of the art to determine a fuel quality parameter in particular for direct injecting internal combustion engines and restrict the range of load and speed which is admitted during operation of the engine accordingly, if low quality fuel was detected. Most known approaches, i.e. those known from WO2005/005813 A1 and WO2005/119034 A1 detect the fuel quality in fuel cut-off conditions of the engine by injecting small quantities of fuel and deriving a measure on the heat generated thereby through a careful evaluation of the engine's behavior. The state of the art aims at determining the cetane number of the fuel.

Although the cetane number may be helpful in limiting the operation range which is allowed for an engine running on a particular fuel, there is need of improvement to a more detailed control which not only limited the allowed speed and speed range and not restricted to certain operation conditions. This need is of great importance in connection with a reduction in pollutants in the exhaust gases of an engine, which reduction becomes a more and more pressing task in engine development.

SUMMARY

The invention, therefore, addresses the problem to guarantee an optimal operation of an internal combustion engine having direct fuel injection almost independently of the fuel quality.

To solve this problem, the invention provides for a method for controlling an automotive internal combustion engine having direct fuel injection, with the method comprising a fuel adaption part in which a fuel quality parameter is determined using a first fuel quality parameter determination procedure when the engine exhibits predetermined operation conditions and a control part which uses the value of the fuel quality parameter or of a fuel combustion characteristics parameter derived from the fuel quality parameter as a target value in a closed-loop control of the start of injection at the engine, with the closed-loop control using a second fuel quality parameter determination procedure being different from the first fuel quality parameter determination procedure to determine an actual value of the fuel quality parameter or of the fuel combustion characteristics parameter derived from the fuel quality parameter.

The invention uses a two part approach to cope with varying fuel quality. The first part determines a target value which describes the fuel quality. The second part controls the engine such that its operation parameters confirm the target value. For this approach it is important that the first part determines the fuel quality and the target value by a procedure that is different to the one used in the control in the second part.

One suitable parameter for the target value is a time of crank angle at which half of fuel mass injected into a combustion chamber has been converted. Obviously, this time of crank angle is individual for each cylinder of a multi-cylinder engine in absolute crank angle values. However, in relative terms, e.g. when referring to the four strokes or cycles of a four stroke engine, the time of crank angle at which half the fuel mass injected has been burned is the same for all cylinders of a multi-cylinder engine. In the literature, the time of crank angle at which half of the fuel mass injected into the combustion chamber has been burned is referred to as MFB50 (mass of fuel burned=50%). It is, of course, a known parameter but the state of the art has not connected this parameter to the fuel quality and in particular not considered MFB50 when controlling the start of injection.

MFB50 can be determined from a combustion feedback signal, as it is known to persons skilled in the art. Generally, MFB50 is a function of a pressure and pressure gradient within the combustion chamber, a volume and a first derivative of the volume of the combustion chamber, an air/fuel mixture composition and an air intake temperature. In one embodiment of this invention, these parameters are used for the second procedure, whereas in the first procedure a fuel quality parameter forms the basis for determining MFB50. The latter procedure allows to use a predefined map which may be obtained from test bed runs of an engine and which stores MFB50 as a function of the fuel quality parameter, and engine speed and load.

The fuel quality parameter employed in this methodology, in turn, can be determined by any method known from the state of the art. In particular the method known from WO 2005/119034 A1 can be used which evaluates during fuel-cut off phases a ignition delay occurring between the start of injection (SOI) and the start of combustion (SOC). The start of combustion may be determined, in particular by using a pressure sensor within the combustion chamber. However, other approaches which detect combustion are possible as well, i.e. using a knock sensor provided at the engine etc.

The inventive approach benefits from the fact that during certain operation phases of an engine, the fuel quality can be determined quite precisely. A relation between fuel quality and MFB50 or any other parameter related to combustion or derived therefrom then allows to obtain a target value from the precisely determined fuel quality and to use this target value in controlling the fuel injection, in particular SOI. The fuel quality does not allow such control, as it can not be determined during all phases engine operation as MFB50 can be.

As already mentioned above, MFB50 is usually identical for all cylinders of a multi-cylinder engine. It is, therefore, advantageous to use a common value for MFB50 for all cylinders of a multi-cylinder engine.

This approach in particular allows to determine MFB50 only for one of the cylinders of the multi-cylinder engine. This requires, for instance only one cylinder to be equipped with a pressure sensor, thus avoiding all cylinders being equipped with the pressure sensor and reducing costs in consequence.

Usually, the variations of fuel quality which occur for fuel stored in a fuel tank are rather minimal. An advantageous embodiment of invention, therefore, determines an updated value for MFB50 only after refueling, since then the fuel quality may change significantly due to the new fuel introduced into the fuel storage.

The present invention will now be described further, by way of example, with reference to the accompanying drawings, in which:

DETAILED DESCRIPTION

In the following, a specific embodiment of the method controlling direct fuel injection for an internal combustion engine according to the present invention will be described with reference to the drawings. The following description will be directed to a case in which the present invention is applied to a diesel engine for driving a vehicle by way of example.

Figure 1:
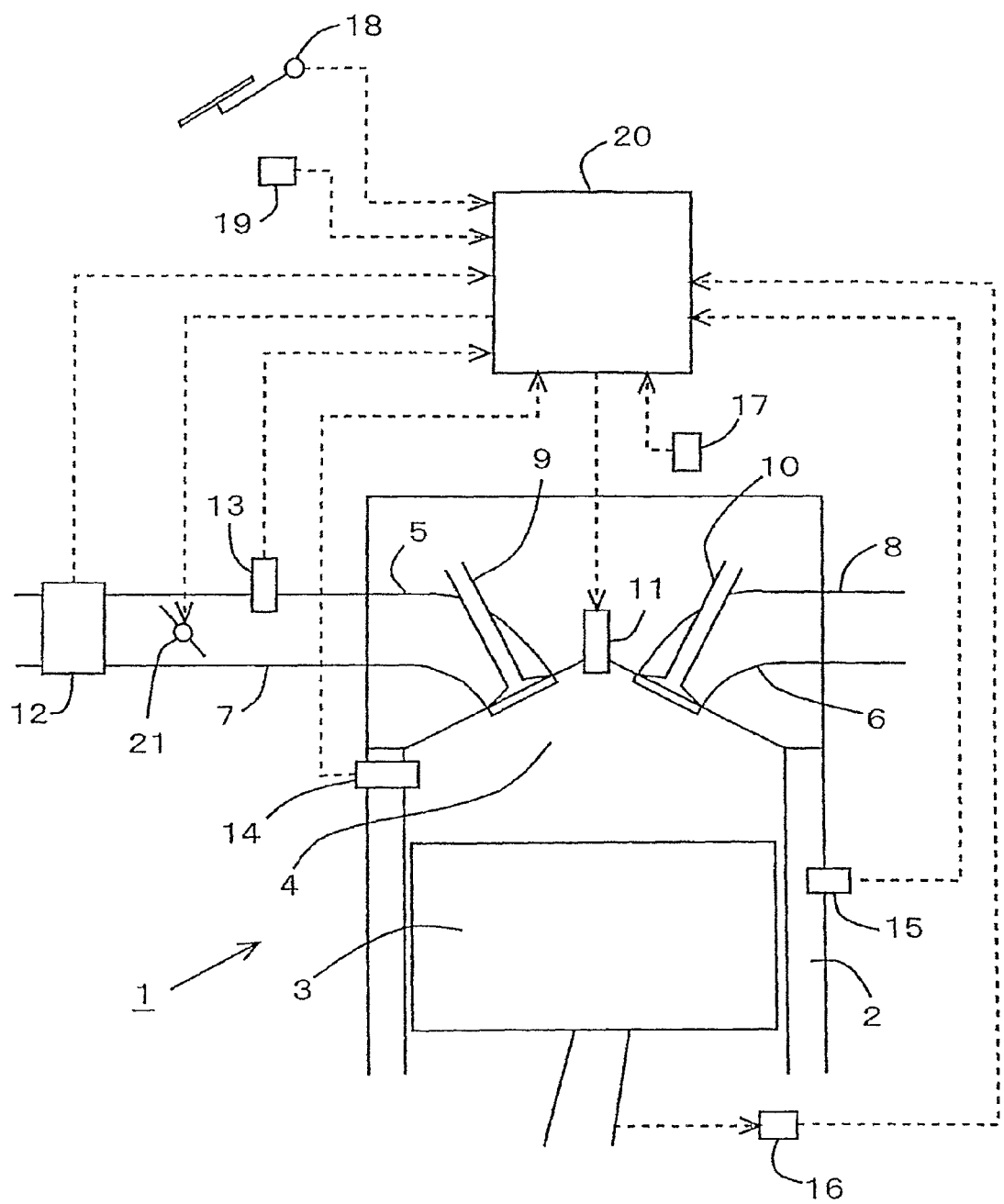
FIG. 1 is a fragmented and block diagrammatic view of an automotive cylinder internal combustion engine

FIG. 1 schematically shows the basic structure of an internal combustion engine according to this embodiment and its intake and exhaust systems. The internal combustion engine 1 has a cylinder 2, in which a piston 3 slidable therein is provided. Above the piston 3 a combustion chamber 4 is formed in the upper portion of the cylinder 2. There opens an intake port 5 and an exhaust port 6. The intake port 5 is connected with an intake passage 7, and the exhaust port 6 is connected with an exhaust passage 8. In the intake passage 7, a throttle valve 21 may be provided, usually in Otto type engines. Most diesel engines do not have a a throttle valve 21.

The intake port 5 and the exhaust port 6 to the combustion chamber 4 are opened and closed by an intake valve 9 and an exhaust valve 10 respectively. A fuel injector 11 for injecting fuel into the combustion chamber 4 is provided at the top of the combustion chamber 4. The injector is connected with a fuel rail (not shown) storing pressurized fuel.

In the intake passage 7, there is provided an air flow meter 12 that outputs an electric signal indicative of the quantity of the intake air flowing in the intake passage 7 and an intake air temperature sensor 13 that outputs an electric signal indicative of the temperature of the intake air flowing in the intake passage 7. Furthermore, the internal combustion engine 1 is equipped with an in-cylinder pressure sensor 14 that outputs an electric signal indicative of the pressure inside the combustion chamber 4, with a water temperature sensor 15 that outputs an electric signal indicative of the temperature of cooling water in a water jacket of the internal combustion engine 1, a crankshaft position sensor 16 that outputs an electric signal indicative of the rotational angle of the crankshaft (in the following crank angle) that is linked with the piston 3 by means of a connecting rod, and with a fuel temperature sensor 17 that outputs an electric signal indicative of the temperature of the fuel supplied to the fuel injector 11, the fuel temperature sensor 17 being provided at the fuel rail.

For the internal combustion engine 1 having the above-described structure, an ECU 20 for controlling the internal combustion engine 1 and in particular the injection of fuel is provided. The ECU 20 is a unit for controlling the operation of the internal combustion engine 1, in particular in accordance with driver's demands if the engine is fitted to an automobile. The ECU 20 is connected via electric wiring with various sensors such as the air flow meter 12, the intake air temperature sensor 13, the in-cylinder pressure sensor 14, the water temperature sensor 15, the crank position sensor 16, an accelerator position sensor 18 that outputs an electric signal indicative of an accelerator position, an atmospheric pressure sensor 19 that outputs an electric signal indicative of the atmospheric pressure. The ECU 20 receives the output signals from the various sensors.

The crankshaft position sensor 16 is adapted to output a signal every time the crankshaft rotates by a certain amount, e.g. 10 degrees. The ECU 20 is also electrically connected with the fuel injector 11 and (if existing) the throttle valve 21 and theses elements are controlled by the ECU 20.

For example, fuel injection by the fuel injector 11 is effected in accordance with a load request to the internal combustion engine 1 derived from an output value of the accelerator position sensor 18.

Therefore, the ECU 20 determines injection parameters to control the fuel injector 11. One parameter which is required to control the fuel injector 11 is the start of injection, i.e. the pointed time at which the injection of fuel into the cylinder 4 has to begin, that is the injector 11 has to open to supply fuel from the fuel rail to the cylinder 4. Another important parameter is the length of injection, which, in connection with the fuel pressure in the fuel rail is decisive for the amount of fuel delivered to the combustion chamber 4.

Fuel injected into the combustion chamber 4, however, does not begin to burn instantaneously. There is some delay of ignition DOI which occurs between the start of injection with SOI and the start of combustion SOC. This delay depends on many parameters. One of them is the fuel quality, in particular at diesel engines. Fuel having a lower cetane number leads to a larger delay of ignition DOI than fuel with a higher cetane number.

In order to compensate for any variations in fuel quality, the ECU 20 considers a parameter describing the ICO quality when determining the control values prescribing start of injection.

When doing so, the ECU 20 performs a method comprising two part or sections. A first part is a fuel adaption part and determines a target value for a parameter derived from a fuel quality parameter, namely the time of crank angle at which half of the fuel mass injected is converted, i.e. burned. This parameter is usually abbreviated as MBF50 (mass of fuel burned=50%).

As already explained in the above general part of the specification, MBF50 is a crank angle which may be defined in relative terms to the combustion cycle, i.e. applies to all cylinders 2 of a multi-cylinder engine.

In the first part, the ECU 20 performs a method for determining fuel quality. A respective program or routine is stored in the ECU 20 in advance and executed at specified time intervals. Alternatively, this routine may be executed, for example, every time the internal combustion engine has revolved a specified number of times, every time the vehicle has travelled a specified distance, or, most preferably, upon refuelling.

Figure 2:
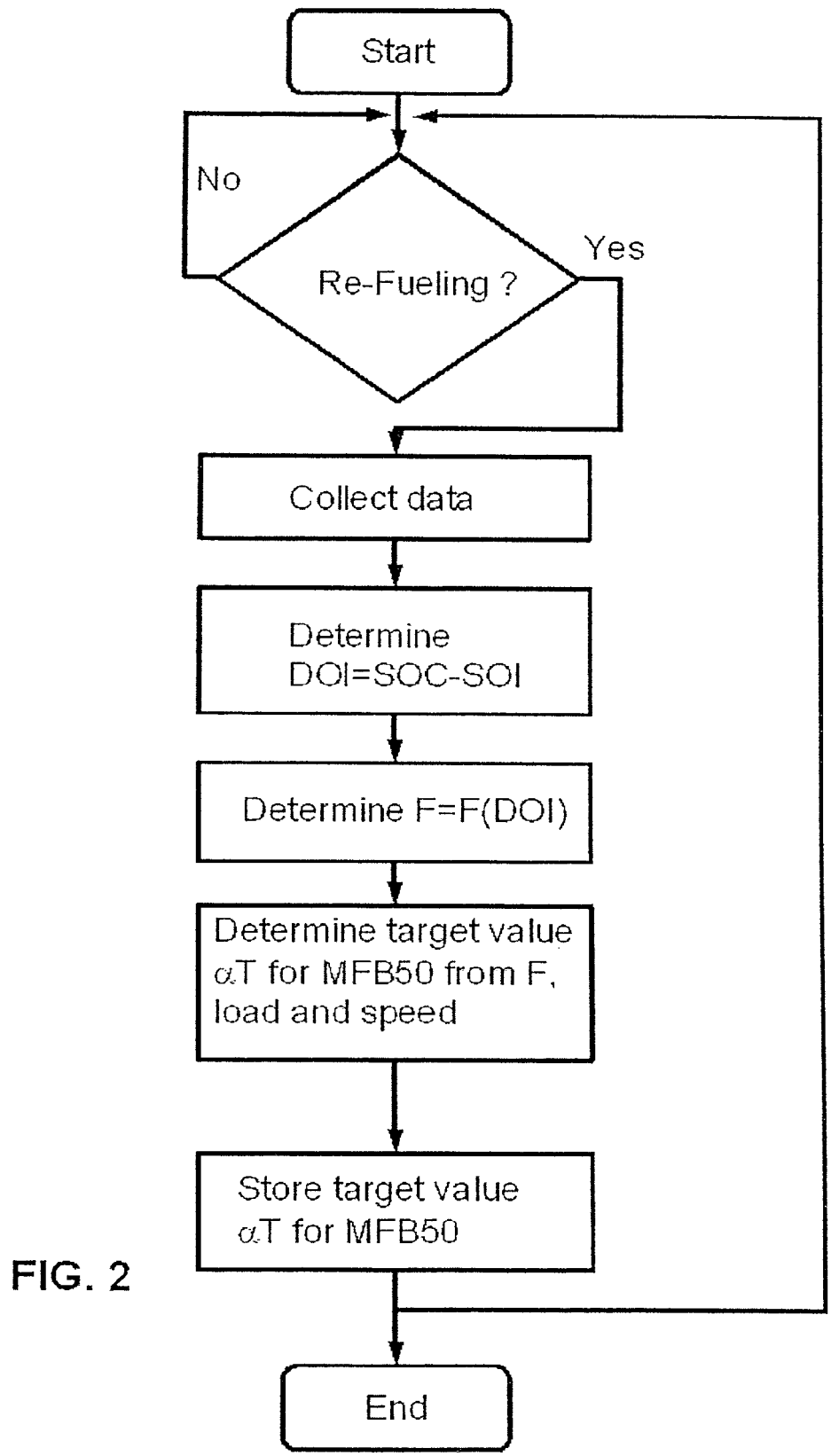
FIG. 2 is a flow diagram of a first part of a method used to control the operation of the engine according to FIG. 1.

Referring to FIG. 2, the first part of the method performed by ECU 20 is now described. After the start of the method, it is first checked, whether the engine's tank was re-fuelled. The method proceeds only, if re-fuelling was detected. Only then, the fuel quality may have changed significantly, as variations for stored fuel are neglectible small.

In a next step, the ECU 20 collects data on the pressure within the engine's combustion chamber 4. As the fuel quality effects all cylinder equally, the ECU 20 needs to collect data only for one cylinder, namely the cylinder 2.

From the collected data, which also comprise data on the start of injection SOI which was set during operation of the engine, a delay of ignition DOI, i.e. the difference between start of injection SOI and start of combustion SOC is computed. The start of combustion, which is required for this calculation, can be detected by known methods, e.g. pressure signal based methods as known from FR 2888880 A1 or DE 10200600127 A1. Both values for SOI and SOC are referred to the engine's crank angle signal from the crank position sensor 16. Instead of a pressure signal, any other combustion feedback signal may be used which allows to derive the delay DOI which occurs between SOC and SOI.

In a next step, the fuel is identified and a fuel quality parameter F is determined, which is a function of DOI. This determination can be made by addressing a respective map which holds the fuel quality parameter F as a function of DOI.

This fuel quality parameter F is then used as an input to determine a target value $\alpha T$ for MFB50. The determination further considers actual values of engine operation parameters, among them engine speed and engine load. Conveniently, the ECU 20 uses a pre-stored characteristics or map which gives the target value $\alpha T$, defining MBF50 as a function of the fuel quality parameter F and the engine speed and load.

This new value $\alpha T$ for MBF50 is stored to be used as target value in the second part of the method performed by ECU 20. The first part is a fuel adaptation part according to the methodology of FIG. 2 which part uses a first procedure to determine the target value for MFB50 and results in a target value for MBF50 which is used in a SOI correction being the second part. This target value may be defined as a function of engine speed and load and represents a value to be achieved during optimal operation of the engine.

Figure 3:
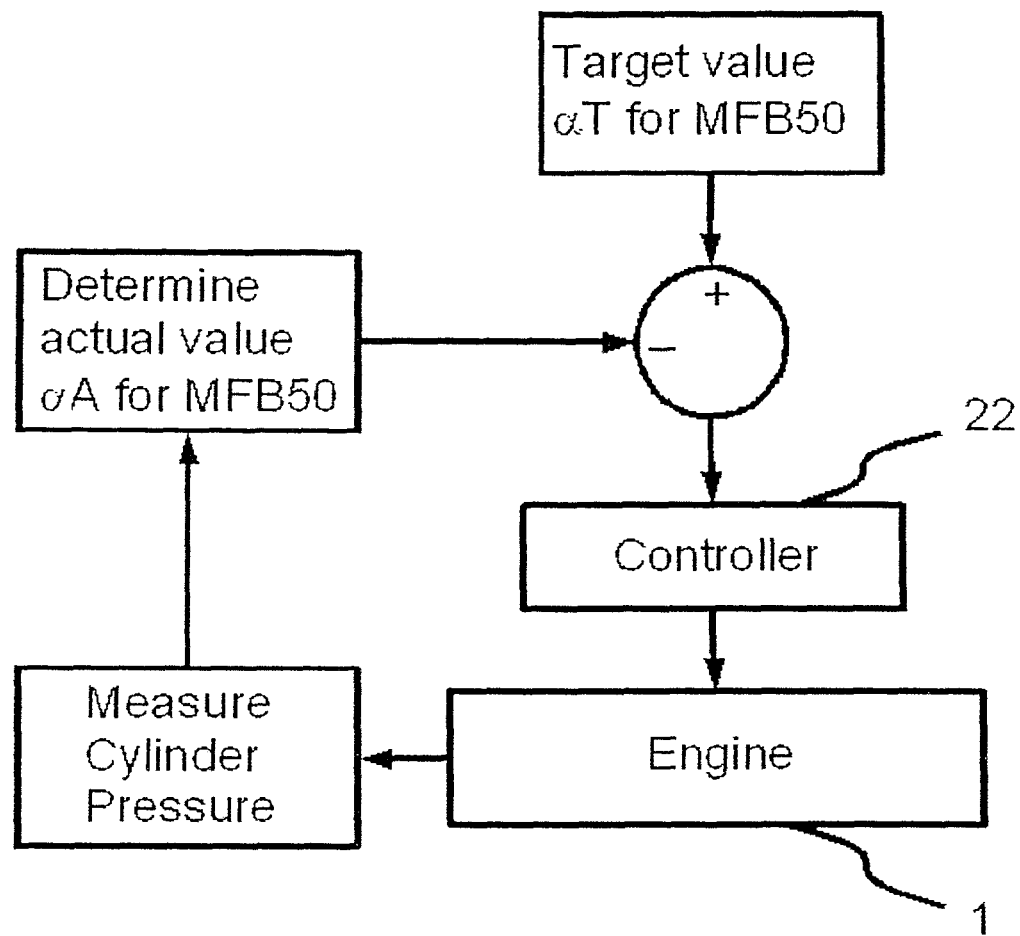
FIG. 3 is a block diagram of a second part of the method.

This second part is represented in FIG. 3 in form of a block diagram.

This block diagram shows that the second part of the method is a closed-loop control controlling the start of injection SOI of the engine or a correction parameter for a value of this start of injection SOI determined by the ECU 20 for operation of the engine 1. Thus, the second part of the method performs an SOI correction correcting a base value for SOI determined otherwise as it is known to persons skilled in the art.

According to FIG. 3 a controller 22 acts on the set-values for SOI which are used to control the timing of the injector 11 at the engine 1. Input to the controller 22 is the difference between the target value $\alpha T$ which was obtained for MBF50 by the first part of the method, i.e. the fuel adaptation section, and the actual value $\alpha A$ determined for MBF50 during operation of the engine. The value $\alpha T$ is retrieved from the storage. Care is taken that always the latest value is used.

The control sets such ensure that the operation of the engine 1 realizes the value $\alpha T$ for MFB50. If this would result in a SOI value which is to be avoided for other reasons appropriate limiting functions became active as it is known in the art of engine control, e.g. for momentum based control systems.

The actual value $\alpha A$ is determined from measuring the cylinder pressure by means of the cylinder pressure sensor 14 during operation of the engine 1. Algorithms are used to determine the actual value $\alpha A$ for MBF50 from the cylinder pressure which are known to persons skilled in the art. According to these known relations MBF50 depend on the pressure and the pressure gradient in the combustion chamber, the volume of air/fuel and first derivative of the combustion chamber 4, the mixture composition and the intake air temperature given by the temperature sensor 13.

The controller 22 corrects SOI such that the actual value for MBF50 detected during normal operation of the engine 1 becomes identical to the target value $\alpha T$ for MBF50 which was determined during the fuel adaptation section of the method.

If the target value is defined as a function of speed and load, these parameter are considered, of course.

The approach advantageously uses the fact that MBF50 is a function, among others, of the SOI used to control the injector 11. With the set-point or target value $\alpha T$ being determined first from the combustion delay, the SOI correction ensures that the engine is operated with optimal SOI values being optimal for the fuel quality actually present. Thus, the method goes far beyond simply considering a once detected fuel quality during operation of the engine.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for controlling an automotive internal combustion engine having direct fuel injection, with the method comprising
   a fuel adaption part in which a first fuel quality parameter is determined using a first fuel quality parameter determination procedure of a first type of fuel quality parameter determination procedure when the engine exhibits predetermined operation conditions, and
   a control part which converts a value of the first fuel quality parameter to a value of a second fuel quality parameter which is different from the first fuel quality parameter and uses this converted value as a target value in a closed-loop control of start of injection in the engine,
   wherein the closed-loop control uses a second fuel quality parameter determination procedure of a second type of fuel quality parameter determination procedure different from the first type of fuel quality parameter determination procedure to determine an actual value of the second fuel quality parameter to obtain an engine operation in which the actual value of the second fuel quality parameter confirms the target value.

2. The method of claim 1 wherein the fuel combustion characteristics parameter derived from the second fuel quality parameter is a time of crank angle at which half of fuel mass injected into a combustion chamber has been converted.

3. The method of claim 2, wherein in the control part computes an error value representing deviations between the target and the actual values and the closed-loop controls the start of injection to minimize the error value.

4. The method of claim 1, wherein an ignition delay occurring between the start of injection and a start of combustion is used by the first fuel quality parameter determination procedure to determine the fuel quality parameter.

5. The method of claim 1, wherein fuel adaption part stores the target value in a storage device and the control part retrieves the stored target value from the storage device to perform closed-loop control even at times in which predetermined operation conditions required for the first fuel quality parameter determination procedure are not met.

6. The method of claim 1, wherein the engine is a multi-cylinder engine, the target and actual values are determined for less than all cylinders of the engine and used to control of fuel injection for all cylinders.

7. The method of claim 6, wherein the actual value is determined only for a single one of the cylinders.

8. The method of claim 1, wherein the first and the second fuel quality parameter determination procedures utilize a pressure signal indicating a pressure within the combustion chamber.

9. The method of claim 1, wherein the predetermined operation conditions for the first fuel quality parameter determination procedure include that a fuel tank of the engine has been refilled.

10. An apparatus for controlling an automotive internal combustion engine having direct fuel injection, which apparatus comprises a controller adapted to perform the method of claim 1.

* * * * *